Sept. 10, 1929.　　　　J. A. DIENELT　　　　1,728,110

MEANS FOR INDICATING EMPTY SEATS IN THEATERS

Filed Oct. 31, 1928　　　3 Sheets-Sheet 1

John A. Dienelt
INVENTOR

BY Victor J. Evans
ATTORNEY

WITNESS

Sept. 10, 1929. J. A. DIENELT 1,728,110
MEANS FOR INDICATING EMPTY SEATS IN THEATERS
Filed Oct. 31, 1928 3 Sheets-Sheet 2

John A. Dienelt
INVENTOR

BY Victor J. Evans
ATTORNEY

WITNESS: John Donovan

Sept. 10, 1929.  J. A. DIENELT  1,728,110
MEANS FOR INDICATING EMPTY SEATS IN THEATERS
Filed Oct. 31, 1928  3 Sheets-Sheet 3
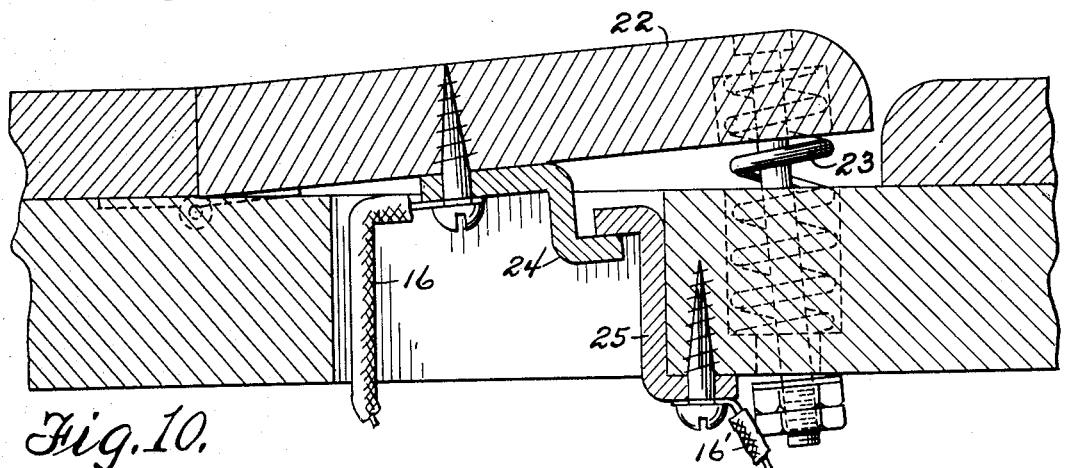
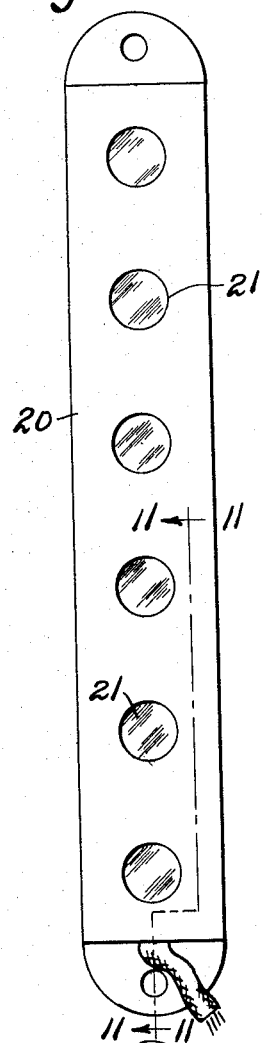
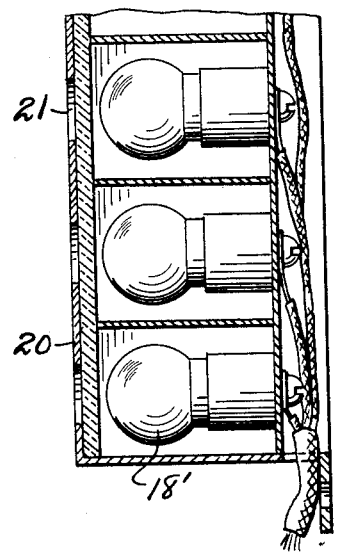
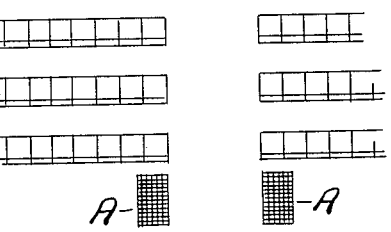
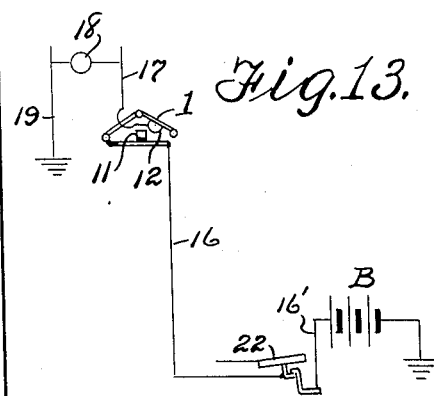
John A. Dienelt
INVENTOR
BY Victor J. Evans
ATTORNEY Patented Sept. 10, 1929.

1,728,110

UNITED STATES PATENT OFFICE.

JOHN A. DIENELT, OF ALEXANDRIA, VIRGINIA.

MEANS FOR INDICATING EMPTY SEATS IN THEATERS.

Application filed October 31, 1928. Serial No. 316,182.

This invention relates to means for indicating empty seats in a theater or the like, the general object of the invention being to provide a system of lamps at the entrance of each aisle, with conductors connecting the lamps with circuit makers and breakers at the seats whereby when a seat is empty, the circuit to the lamp representing the seat will be closed so that a person can readily see which seat is unoccupied.

Another object of the invention is to provide means for preventing the closing of each lamp circuit when a person rises from the seat in order to allow another person to pass.

A still further object of the invention is to provide indicating means on each end chair of each row of seats for indicating the empty seats in the row.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 9 is a section on line 9—9 of Figure 2.

Figure 10 is a view of the indicator means on the end chair of each row.

Figure 11 is a section on line 11—11 of Figure 10.

Figure 12 is a diagrammatic view showing how the indicators are arranged at the entrance of an aisle.

Figure 13 is a diagrammatic view of the circuits.

Figure 1:
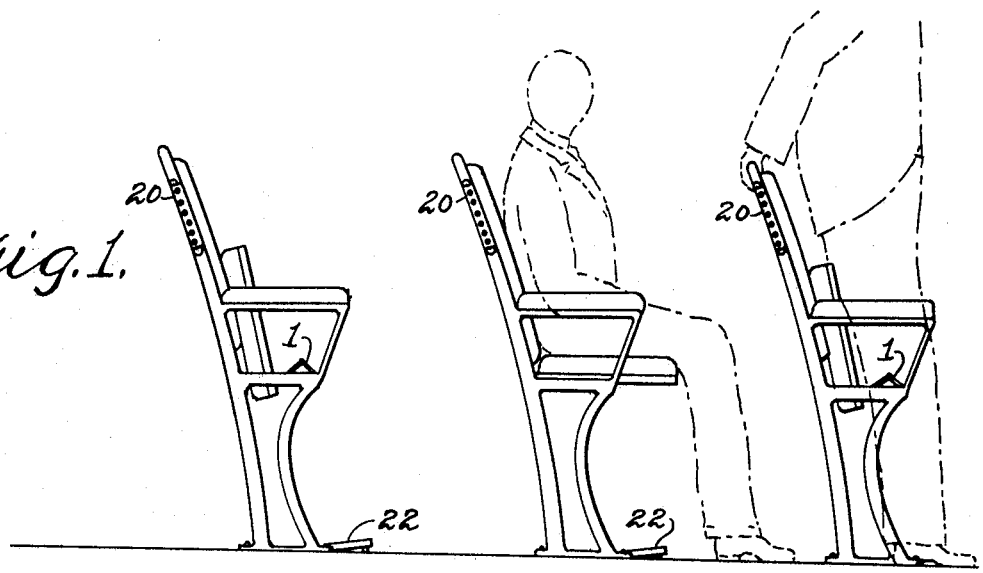
Figure 1 is a diagrammatic view showing the invention in use on three rows of seats.
Figure 2:
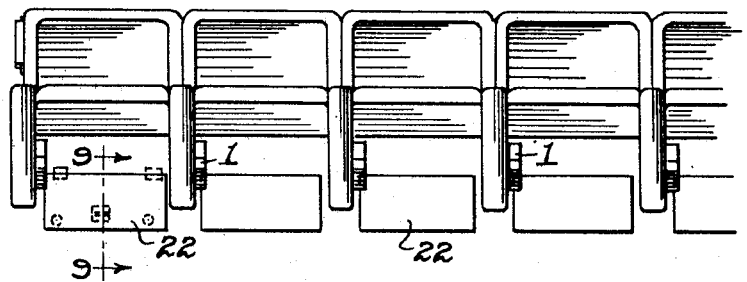
Figure 2 is a plan view of some of the seats of a row.

As shown in these views, a circuit breaker and maker is placed under the seat part of each chair, this device comprising a pair of levers 1 pivoted together at their adjacent ends and one lever having its outer end pivotally connected to the supporting brackets 2 carried by a plate 3 which is suitably supported on the chair and which is insulated from the chair by the plate 4 of non-conducting material. The other lever has a pin 5 at its outer end, the ends of which engage an elongated slot 6 formed in each of a pair of brackets 7 carried by the plate 3 and this pin 5 and the pivot pin 5' of the other lever are connected together by one or more springs 9 which act to hold the pin 5 in the rear ends of the slots 6 so that the levers are normally held in raised position. A small plate 10 is insulated from the plate 3 and carries a pair of spring contacts 11. A switch part 12 is attached to the front lever 1 and this part and the contacts 11 are so arranged that when the levers are in raised position, said part 12 will be positioned between the contacts so that the plate 10 is electrically connected with the plate 2, but when the levers are in lowered position, the part 12 is moved away from the contacts, as shown in Figure 5, and thus the circuit is broken.

Figure 5:
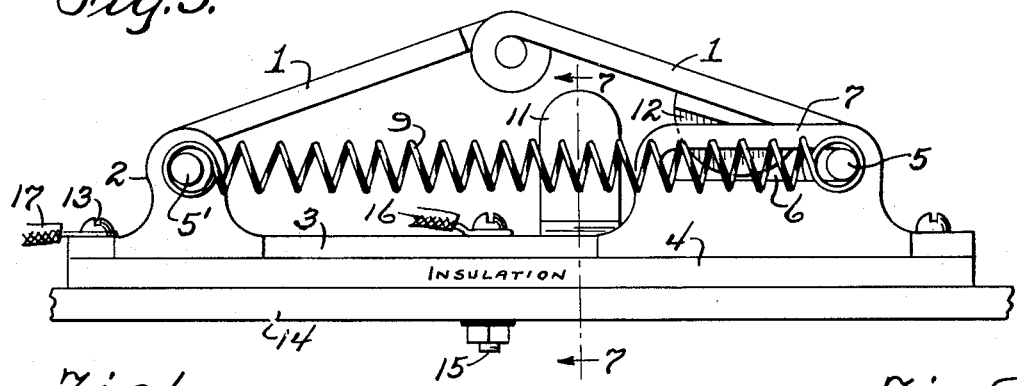
Fig. 5 is a similar view but showing the parts in lowered position, with the circuit broken.
Figure 6:
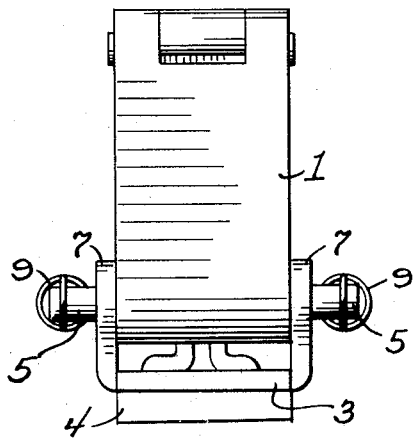
Figure 6 is an end view of Figure 4.
Figure 7:
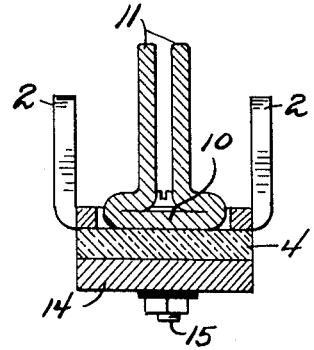
Figure 7 is a section on line 7—7 of Figure 5.
Figure 8:
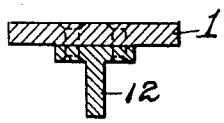
Figure 8 is a section on line 8—8 of Figure 4.

As will be seen, when the seat part of the chair is in operative position or in lowered position, it will rest on the upper ends of the levers and thus when the chair is occupied, the weight of the occupant will cause the seat part to lower the levers and thus move the part 12 out of engagement with the contacts 11, as shown in Figure 5.

When the seat is not occupied, the springs 9 will raise the levers and the seat so that the part 12 will engage the contacts 11.

A terminal screw 13 passes through the plate 3, the plate 4 of non-conducting material and the supporting part 14, and a terminal screw 15 passes through the plate 10, the plate 4 and the part 14, but this screw 15 is insulated from the part 14. A conductor 16 is connected with the screw 15 and a conductor 17 is connected with the screw 13. The conductor 17 is connected to a lamp 18 which is also connected to a ground conductor 19, the conductor 16 being connected to a source of supply. Thus when the seat is occupied, the circuit to the lamp 18 will be broken, but when the seat is not occupied, the circuit will be closed and thus the lamp will be lighted so that a person can tell by the lighted lamps which seats are unoccupied.

The lamps may be arranged in groups A at the entrance to the aisle in the floor, each group being covered by a transparent plate or they may be placed elsewhere, but they should be so located that a person can observe them before passing down the aisle. Figure 12 shows a group of lamps on each side of the entrance, the lamps of each group being connected with half of the chairs of each group of chairs between two aisles. The lamps in each group are arranged in rows and the lamps in each row are connected with the chairs in each row of chairs and the lamps should be suitably designated to indicate which chair they are connected with.

I may also place a group of lamps 18' in a casing 20 arranged on the back of each outer chair of each row of chairs, each lamp being connected with each chair in the row or the lamps can be connected with the chairs of half a row, with the lamps on the other outer chair of the row connected with the other half of the row so that these lamps will indicate the empty chairs in the row or half a row. These lamps may be used instead of the lamps at the entrance of the aisles or they may be used with said lamps by connecting the lamps on the chairs in series with the lamps in the groups A.

Each casing 20 is divided into compartments, with a lamp in each compartment, with the outer face of the casing having windows 21 therein through which the light rays pass. These windows may be covered by transparent material so as to give a subdued light which will not interfere with the vision of the occupants of the chairs.

Figure 3:
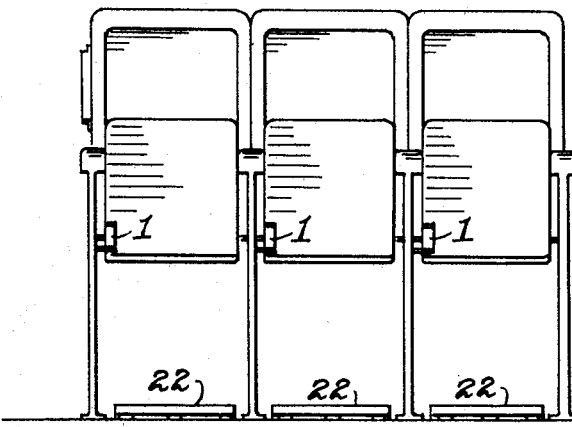
Figure 3 is a front view of three seats in a row.
Figure 4:
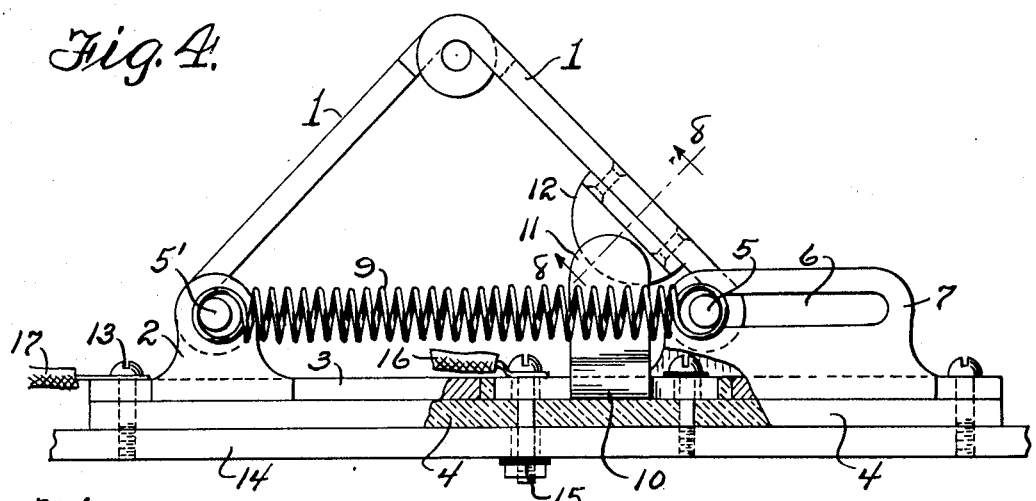
Figure 4 is an enlarged elevation of the circuit breaker and maker associated with each seat.

In order to prevent the lamps being lighted when persons stand up in order to permit other persons to pass by them, as shown at the right hand side of Figure 1, I provide means for breaking the circuit by the standing person. Such means consists of a hinged plate 22 arranged in the floor under each chair in such a manner that when a person stands up, he will step on such plate and thus lower the same against the action of the spring plunger 23 and this lowering of the plate will move the contact 24 thereon out of engagement with the stationary contact 25. Each contact 24 is connected with a conductor 16 and each contact 25 is connected by a conductor 16' with a source of supply, which is shown in Figure 3 as a battery B. Thus it will be seen that when a person stands up for any reason and pushes back the seat part of the chair, the circuit is broken by the person standing on the plate 22 so that the lamp is not lighted even though the seat part is raised. These means are particularly desirable for use with the arrangement shown in Figure 12, for if such means were not used, persons standing at the entrance of an aisle would hurry down the aisle to secure the vacant seat as soon as a lamp was lighted and not wait to see if the lamp would be extinguished again by the occupant of a seat sitting down again after he had risen to let other persons pass by him. Such means are also desirable where a number of persons are leaving their seats and a group is waiting to take their places, for in this case, the persons waiting would know how many persons were actually leaving, as differentiated from those merely standing to provide adequate passage.

From the foregoing it will be seen that I have provided simple means for indicating empty seats in a theatre or the like so that the patrons can readily find the empty seats without the use of an usher.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In combination with rows of seats in a theater or other building, a circuit maker and breaker device associated with each seat, means whereby the device is moved to circuit breaking position when the seat is occupied, a group of lamps, a circuit for each lamp which includes the circuit breaker of each chair whereby each lamp is lighted when the seat is unoccupied, but the circuit to each lamp is broken when the seat is occupied and means associated with each seat and operated by the occupant of the seat when he stands up, for breaking the circuit of each lamp.

2. In combination with rows of seats in a theater or other building, a circuit maker and breaker device associated with each seat, means whereby the device is moved to circuit breaking position when the seat is occupied, a group of lamps, a circuit for each lamp which includes the circuit breaker of each chair whereby each lamp is lighted when the seat is unoccupied, but the circuit to each lamp is broken when the seat is occupied, means associated with each seat and operated by the occupant of the seat when he stands up, for breaking the circuit of each lamp, such means comprising a hinged member on the floor under each seat, spring means for holding the member in raised position but permitting the member to be lowered when a person stands thereon, a contact arranged in the circuit of each lamp and carried by said hinged member and a stationary contact engaged by the first mentioned contact when the member is in raised position.

3. In combination with the rows of chairs in a theater or the like, a circuit maker and breaker device associated with each chair, spring means for holding the device in circuit closing position with the seat part of the chair raised whereby when the seat is occupied, the device will be moved to circuit breaking position, a circuit controlled by each device, a second circuit making and breaking device arranged in each circuit and placed under each chair and moved to circuit breaking position by a person arising from the seat and a lamp in each circuit.

4. In combination with the rows of chairs in a theater or the like, a circuit maker and breaker device associated with each chair, spring means for holding the device in circuit closing position with the seat part of the chair raised whereby when the seat is occupied, the device will be moved to circuit breaking position, a circuit controlled by each device, a second circuit making and breaking device arranged in each circuit and placed under each chair and moved to circuit breaking position by a person arising from the seat, a lamp in each circuit, said lamps being arranged in groups, each group representing a number of the chairs.

In testimony whereof I affix my signature.

JOHN A. DIENELT.